Nov. 17, 1970 A. PEBLER 3,541,378
TUNGSTEN OXYHALIDE INCANDESCENT LAMPS
Filed Jan. 8, 1968
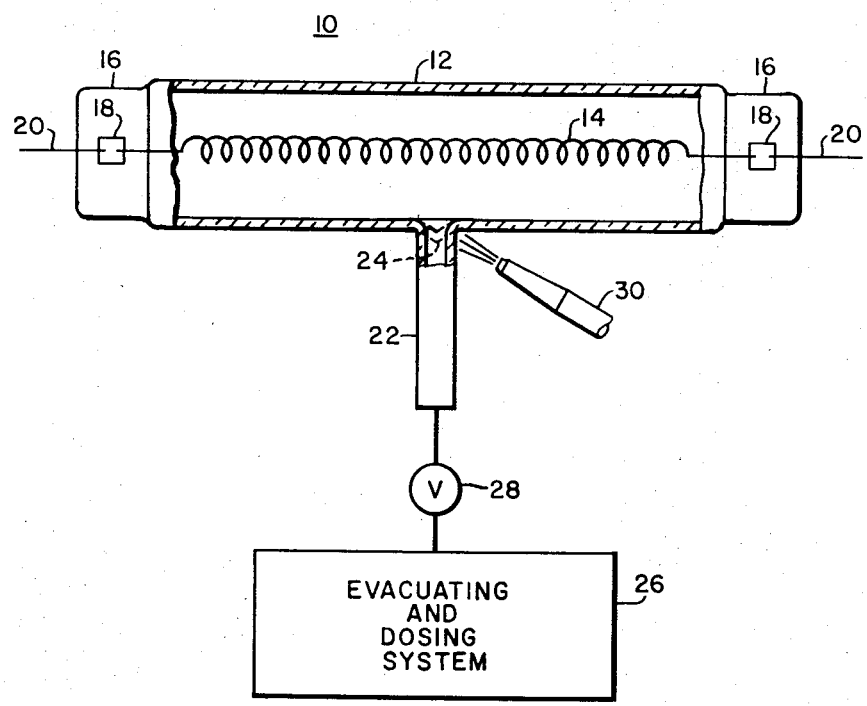
WITNESSES
Leon M. Garman
Walter Sutcliff
INVENTOR
Alfred Pebler
BY
W. D. Palmer
ATTORNEY

United States Patent Office 3,541,378
Patented Nov. 17, 1970

3,541,378
TUNGSTEN OXYHALIDE INCANDESCENT LAMPS
Alfred Pebler, Monroeville, Pa., assignor to Westinghouse Electric Corporation, Pittsburgh, Pa., a corporation of Pennsylvania
Filed Jan. 8, 1968, Ser. No. 696,418
Int. Cl. H01k 1/50
U.S. Cl. 313—222     2 Claims

ABSTRACT OF THE DISCLOSURE

An incandescible lamp with a tungsten filament and an atmosphere comprising inert gas, tungsten oxyhalide, halogen and oxygen, with the total halogen to total oxygen contained in the lamp either chemically combined or uncombined being in a relative gram-atom ratio of about 4:1. The halogen and oxygen are added to the lamp either as separate gaseous constituents or as tungsten oxytetrahalide. A preferred range of halogen content is specified. There is no visible blackening of the envelope during lamp lifetime, and the overall lamp operation is improved.

BACKGROUND OF THE INVENTION

The incandescent tungsten-halogen lamp is now an important commercial item even though the basic lamp operation is not fully understood. While there have been discussions of regenerative cycles involving formation of tungsten halides and redeposition of tungsten on the filament, what is clearly demonstrated in these lamps is that tungsten condensation onto and blackening of the lamp envelope has been minimized resulting in improved, long lasting lamps.

The tungsten-iodine lamp is presently the most important commercial tungsten-halogen lamp because of the relative inertness of the iodine with respect to filament end attack. The more reactive halogens bromine, chlorine and fluorine react with the relatively cool tungsten ends causing lamp failure at this point. The operating lifetime of other tungsten-halogen lamps have been disappointing, largely due to the reactive nature of the halogen with the filament ends, and subsequent failure at this area. The more reactive halogens have been limited to use in high intensity short lifetime tungsten-halogen lamps. It is known in the art that the inclusion of small amounts of oxygen in iodine lamps increases the operating lifetime of the lamp for some special applications.

SUMMARY OF THE INVENTION

It is a general object of the invention to provide an improved tungsten-halogen incandescible lamp which operates at a high filament temperature without lamp blackening over a long operational lifetime.

This object and others which will become apparent as the description proceeds are accomplished by providing a lamp containing predetermined amounts of halogen and oxygen in a gram-atom ratio of about 4:1. The halogen and oxygen are preferably introduced into the lamp as tungsten oxytetrahalide which will have the 4:1 gram-atom ratio. The halogen and oxygen can also be supplied to the lamp as fill constituents in about a 4:1 gram-atom ratio, and the tungsten oxytetrahalide will form during lamp operation. The present invention also specifies a preferred amount of halogen to be included in the lamp. This preferred amount, depending on the halogen used, can be varied from about $10^{-7}$ to $10^{-9}$ gram-moles of halogen per cc. of lamp volume.

BRIEF DESCRIPTION OF THE DRAWING

The sole figure of the drawing is an elevational view of a double-ended incandescible lamp embodiment of the present invention and a schematic showing of the dosing system, illustrating the lamp fill dosing operation and the completed lamp.

DESCRIPTION OF THE PREFERRED EMBODIMENT

In the preferred lamp embodiment 10 shown in FIG. 1, the lamp comprises an elongated, generally tubular, vitreous light-transmitting envelope 12, formed of quartz or similar high temperature resistant light-transmitting material. As an example, the envelope 12 is quartz with a 14 mm. O.D. and 1 mm. wall thickness, and having a volume of about 2.8 cc. Enclosed within the envelope 12, is a tungsten filament 14, which is preferably a coiled-coil disposed generally symmetrically about the longitudinal axis of the envelope 12. As an example, the filament 14 is formed of about 7 mil. diameter tungsten wire, and the diameter of the secondary coil of the coiled-coil filament is about 3 mm. The parameters of the envelope configuration, volume, the filament design and disposition can be varied to provide a lamp that desirably has an inside wall temperature of the envelope of at least 350° C. This operating inside wall temperature assures proper operation of the lamp by preventing condensation of constituents on the envelope. With this type of lamp, the inside envelope wall temperature normally operates at reasonably high temperatures due to the envelope configuration and the power input. As an example, the lamp described in the specific example when operated at 120 volts, 400 watts has a minimum inside wall temperature of about 400° C. The tungsten filament 14 is sealed through the press portion 16 of the envelope 12 via conventional holybdenum ribbon seals 18. The externally extending conductors 20 are adapted to be connected to a source of electrical energy for operating the lamp. The evacuating tubulation 22 is an extension of the envelope 12 during lamp fabrication, and is connected to a conventional evacuating and dosing system 26.

In the preferred embodiment, the partially fabricated lamp 10 is evacuated via tubulation 22 and system 26. The lamp 10 and tubulation 22 are filled with a 90% argon–10% nitrogen fill gas to a pressure of about 600 torr of tungsten oxytetrabromide is established throughthe tungsten filament. The lamp 10 and tubulation 22, as well as the system 26 which contains tungsten oxytetrabromide are heated to about 150° C. at which temperature an equilibrium partial pressure of about 0.03 torr of tungsten oxytetrabromide is established throughout the combined system. This corresponds to supplying about $1 \times 10^{-9}$ gram-moles of tungsten oxytetrabromide per cc. of lamp volume. The dosing system is separated from the tubulation and lamp by closing a valve 28. The lamp and tubulation are then quenched to room temperature and the lamp is sealed at point 24 by a conventional gas-air burner 30 to complete fabrication of the lamp. This lamp when operated at 400 watts showed no blackening of the envelope after several thousand hours of operation.

The exact mechanism in the lamp described above which prevents deposition on the envelope wall of light absorbing products, specifically tungsten or tungsten compounds, is not fully understood. However, it is clear that at the higher temperature regions near the filament the tungsten oxytetrabromide continually dissociates providing a proportion of bromine and oxygen which will be free to combine with tungsten evolved from the filament.

In another embodiment of the invention, the lamp 10, comprising the structure specified above, is again evacuated and gas filled via tubulation 22 and system 26. The gas introduced is a mixture of 90% argon–10% nitrogen with sufficient oxygen added to establish an oxygen partial pressure of about 0.1 torr, while the total gas pressure is about 600 torrs. The bromine-containing portion of the system 26 is immersed in a low temperature bath, made up of a trichloroethylene-Dry Ice mixture maintained at a temperature of about −57° C. This establishes a vapor pressure of bromine that is allowed to equilibrate throughout the lamp. The lamp is quenched and sealed, and the bromine partial pressure at room temperature is about 0.4 torr. The amount of bromine dosed in this example is about $2 \times 10^{-8}$ mole of bromine per cc. of lamp volume. This amount can be varied while maintaining the bromine to oxygen gram-atom ratio of about 4:1. The preferred bromine content is from $10^{-8}$ to $10^{-9}$ gram-moles of bromine per cc. of lamp volume.

This lamp can be operated at 400 watts over an extended period of time without any blackening of the envelope. The exact mechanism by which the lamp described above prevents deposition on the envelope wall of light absorbing material, specifically tungsten or tungsten products, is not fully understood. However, it is clear that under the thermodynamic conditions present in the lamp during operation the bromine and oxygen react with tungsten evolved from the filament forming tungsten oxybromide, and tungsten oxytetrabromide formation is thermodynamically favored. The tungsten oxybromide dissociates at the higher temperatures near the filament continually providing a proportion of bromine and oxygen which is free to combine with tungsten evolved from the filament.

Other halogens can be similarly dosed under the appropriate dosing conditions and substituted for the bromine in the example above in an amount of from $10^{-9}$ to $10^{-7}$ gram-moles of halogen per cc. of lamp volume. The lesser amounts are preferable for the more reactive halogens, chlorine and fluorine, and the larger amounts are preferred for the less reactive iodine. The important factor is that the amount of oxygen included in the lamp is adjusted to the gram-mole amount of halogen to provide a halogen to oxygen gram-mole ratio of about 4:1. The halogen and oxygen react during lamp operation with tungsten evolving from the filament forming tungsten oxyhalide, the provision of the gram-atom of halogen to oxygen ratio of about 4:1 insures that tungsten oxytetrahalide is formed. The tungsten oxytetrahalide formation is also thermodynamically favored over formation of tungsten halides. The tungsten oxyhalides dissociate at the higher temperature near the filament to provide a proportion of halogen and oxygen which is free to combine with tungsten evolved from the filament.

Similarly, the corresponding tungsten oxytetrahalides can be substituted for the tungsten oxytetrabromide in the previous lamp dosing example. The tungsten oxytetrahalide can be substituted in an amount to provide from $10^{-9}$ to $10^{-7}$ gram-moles of halogen per cc. of lamp volume. The preferred range for the tungsten oxytetrabromide is from $10^{-9}$ to $5 \times 10^{-9}$ gram-moles of $WOBr_4$ per cc. of lamp volume. The tungsten oxytetrahalides dissociate in the high temperature regions near the filament providing a proportion of halogen and oxygen which is free to combine with tungsten evolved from the filament.

The prior art work on tungsten-halogen lamps recognized that a minimum inside wall temperature of the envelope is required to assure that no reaction products formed during lamp operation are deposited on the envelope. For tungsten-iodine lamps without oxygen this inside wall temperature is specified in the prior art at from 250° C. to 1200° C.

It has been found that for lamps containing bromine and oxygen as set forth in the above examples, the preferred minimum wall temperature of the envelope is at least 350° C. for good operation of the lamp. A lower bulb wall temperature can be tolerated with reasonably good operation for these lamps.

The filament temperature of these lamps is of course dependent on the wattage and the designed lifetime. The lamps of the present invention and preferably operated with a tungsten filament temperature of from 2900–3400° K.

For the more reactive halogens as used in the lamps of the present invention, the minimum wall temperature of the envelope can be still lower than in the case of the bromine-containing lamps. In the lamps of the present invention the bulb wall normally operates at higher temperatures than these preferred minimums due to the envelope configuration and the power input.

The tungsten oxyhalides are thermochemically more stable than simple tungsten halides, and can therefore deposit the tungsten on the hotter portions of the filament from which tungsten is evaporating at a faster rate, thereby effecting longer operating lifetime.

The vapor pressures of the different halogens and tungsten oxytetrahalides vary and the dosing conditions must be adjusted accordingly to supply the lamp with the proper gram-mole amounts of the particular halogen.

In the above embodiments the 600 torrs pressure of the 90% argon–10% nitrogen atmosphere is not critical in the operation of the lamp. The pressure of the added gas which is inert with respect to the tungsten filament can be varied within the spirit of the invention as long as the minimum wall temperature is maintained. The operating atmosphere in tungsten-iodine lamps is now about two atmospheres of fill gas and this pressure can be utilized in the present lamps. The argon-nitrogen inert gas mixture is merely a preferred mixture and other inert gases or combination of same can be utilized in the present invention.

While the invention was described with respect to a specific size and wattage lamp, the invention can be applied to tungsten-halogen incandescible lamps in general. A single-ended lamp can be used in the present invention. It is to be understood that the invention is not to be limited to the illustrative examples used to describe the invention.

I claim as my invention:

1. An incandescible lamp comprising, a light-transmissive envelope having a predetermined configuration and enclosing a predetermined volume, a tungsten filament disposed in predetermined position within the volume enclosed by said envelope, conductive lead-ins sealed through said envelope and electrically connected to said filament, said lamp being adapted to be operated with a predetermined power input and a minimum inside wall temperature for said envelope, said envelope enclosing a predetermined amount of inert gas, and tungsten oxytetrabromide in an amount providing a bromine content of from about $10^{-8}$ to $10^{-9}$ gram-mole of bromine per cc. of lamp volume.

2. The lamp as specified in claim 1, wherein said tungsten oxytetrabromide is present in an amount of about $1 \times 10^{-9}$ gram-mole per cc. of volume enclosed by said envelope.

References Cited

UNITED STATES PATENTS

| | | | |
|---|---|---|---|
| 2,179,437 | 11/1939 | Socolofsky | 313—222 X |
| 3,242,372 | 3/1966 | Bonazoli et al. | 313—222 |
| 3,263,113 | 7/1966 | Schröder | 313—223 |
| 3,364,376 | 1/1968 | Collins et al. | 313—222 |

OTHER REFERENCES

"Incandescent Bromine Cycle Lamps," by F. A. Mosby, L. J. Schupp, G. G. Steiner, and E. G. Zubler, Illuminating Engineering, April 1967, pp. 198–203.

JAMES W. LAWRENCE, Primary Examiner

P. C. DEMEO, Assistant Examiner

U.S. Cl. X.R.

313—223